United States Patent [19]
Kessler

[11] 3,776,676
[45] Dec. 4, 1973

[54] INSULATED RUNNER SYSTEM FOR PLASTIC CAP MOLDS

[76] Inventor: Milton Kessler, 6690 Harrington, Youngstown, Ohio

[22] Filed: June 26, 1972

[21] Appl. No.: 266,365

Related U.S. Application Data

[62] Division of Ser. No. 61,766, Aug. 6, 1970, abandoned.

[52] U.S. Cl............ 425/250, 249/110, 264/329, 425/292, 425/441, 425/444
[51] Int. Cl............................................. B29f 1/08
[58] Field of Search.................. 249/110; 264/328, 264/329, 318; 425/247, 250, 292, 441, 444

[56] References Cited
UNITED STATES PATENTS

| | | |
|---|---|---|
| 3,523,991 | 8/1970 | Tucker.......................... 264/318 X |
| 2,571,766 | 10/1951 | Saulino ............................ 425/250 |
| 2,672,653 | 3/1954 | Simpkins et al. ............... 425/250 X |
| 2,596,993 | 5/1952 | Gookin .......................... 249/110 X |
| 2,483,094 | 9/1949 | Harvey........................... 249/110 X |
| 3,533,594 | 10/1970 | Segmuller....................... 249/110 X |

OTHER PUBLICATIONS

Pye, Injection Mold Design, pp. 145–147, 1968, Plastics Institute, London, England.
Glanvill et al., Injection–Mould Design Fundementals, pp. 143–144, 1965.

Primary Examiner—J. Spencer Overholser
Assistant Examiner—John E. Roethel
Attorney—Max L. Libman

[57] ABSTRACT

In extrusion molding of plastic screw caps, the unit cap cost can be closely related to the number of caps which can be made at each cycle of the mold operation. A system is described which maximizes the number of caps by providing hot, self-insulated runners which feed a number of relatively short sprue channels with hot plastic so that a larger number of caps than before can be molded in a single cycle without the remoter caps at the edges of the die being fed plastic too cool to permit successful caps to be molded.

2 Claims, 8 Drawing Figures

INVENTOR
Milton Kessler

INVENTOR
Milton Kessler

BY  *Max L. Libman*

ATTORNEY

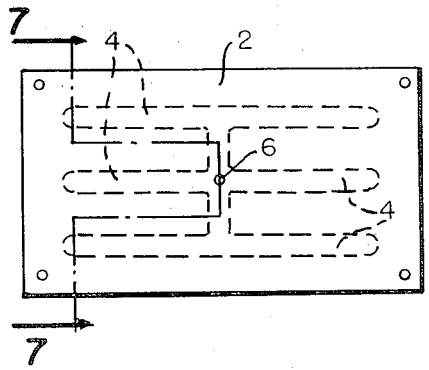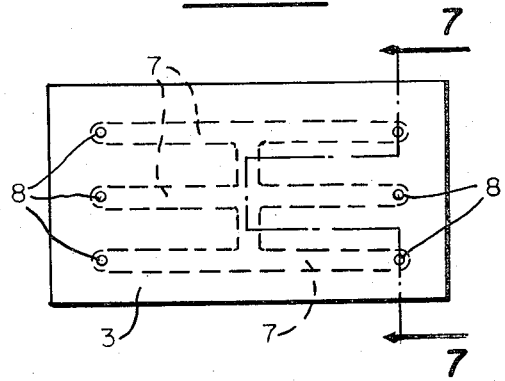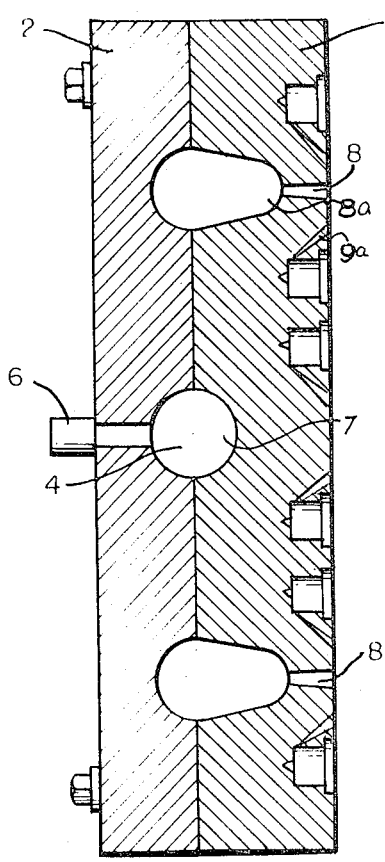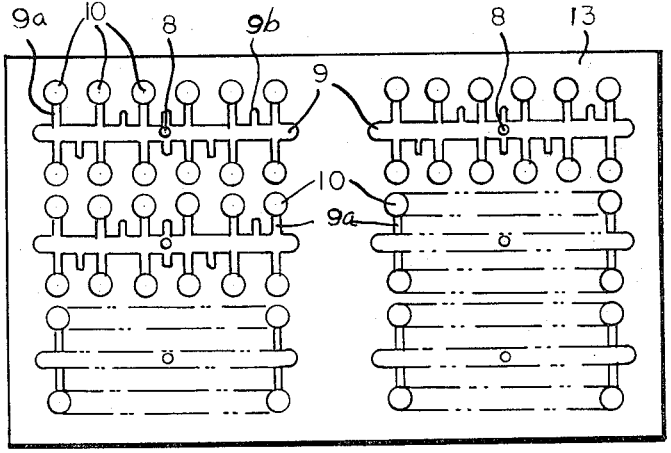

INSULATED RUNNER SYSTEM FOR PLASTIC CAP MOLDS

This is a division of application Ser. NO. 61,766, filed Aug. 6, 1970, now abandoned.

Plastic screw caps are used literally by the hundreds of millions as closures for all kinds of bottled household goods such as detergents, liquid wax, hand lotions, etc., and although they are very inexpensive, they are still sold by the manufacturer of such caps largely on a price basis. It is therefore important that the unit cost of such caps shall be kept down to a minimum. The caps are typically made of thermoplastic material Therefore extrusion molding, wherein the thermoplastic material in practically liquid form is forced at high pressures and temperatures into a mold which is formed in two major parts, one of which is stationary and contains a major portion of the mold cavities, and the other of which is movable, so that after the caps have been formed and have cooled sufficiently to retain their shape, the mold can be automatically opened and the formed caps ejected, Of course, the larger the number of caps that can be made in a single operation, the smaller will be the unit cap cost. Thereore, the cap mold will be made with as many cap cavities as possible; however, the plastic must be fed to these cap cavities through sprues which are typically formed in either the stationary or movable face of the mold as channels through which the molten plastic material is supplied to the individual cavities. As these are rather thin channels, they also cool as the newly molded caps cool, and the sprues must therefore also be ejected after each molding cycle of the machine. This material is not wasted, as it can be re-used by being added to a subsequent feed batch, since the thermoplastic material can be readily remelted.

In order that the newly-formed caps may become sufficiently hardened or "set" so that they can be quickly removed from the mold, the mold is typically water-cooled in order to carry off the excess heat and permit rapid setting of the thermoplastic material. This cooling also affects the sprues through which the material is supplied to the individual cap molds, and this also provides a limitation on the number of individual cap cavities which can be placed on a given mold, since if the sprue is too long, the plastic has cooled sufficiently by the time it gets to the end of the sprue, so that the material is too stiff for successful molding of the caps, and this constitutes a limitation on the number of cap cavities which can be placed on a single mold, and therefore on the number of caps which can be made in a single cap cycle.

It is a major object of the present invention to overcome the above difficulty, and to provide a system whereby the number of cap cavities on a given die plate can be increased without any major changes in the molding equipment. This is accomplished essentially by using a larger number of shorter sprues, each of which is supplied through a self-insulated runner or feed channel of sufficiently great diameter so that the plastic flowing in the runner becomes chilled and stiff at the circumference or periphery of the runner, thus providing in effect an insulated tube, at the center of which the plastic remains sufficiently warm to flow freely to the individual sprues at a sufficiently high temperature that even the outer caps can be successfully molded.

The specific nature of the invention, as well as other objects and advantages thereof, will clearly appear from a description of a preferred embodiment as shown in the accompanying drawings, in which:

FIG. 5 shows one of the stationary plates of the mold containing a half section of the insulated runner channels;

FIG. 6 shows the mating plate to that shown in FIG. 5, showing the other half section of the stationary insulated runner channe;

FIG. 7 is a sectional view of the two assembled plates of FIGS. 5 and 6 taken on line 7—7; and FIG. 8 is a face view of the mold shown in FIG. 7, showing the configuration of all of the mold cavities.

Figure 1:
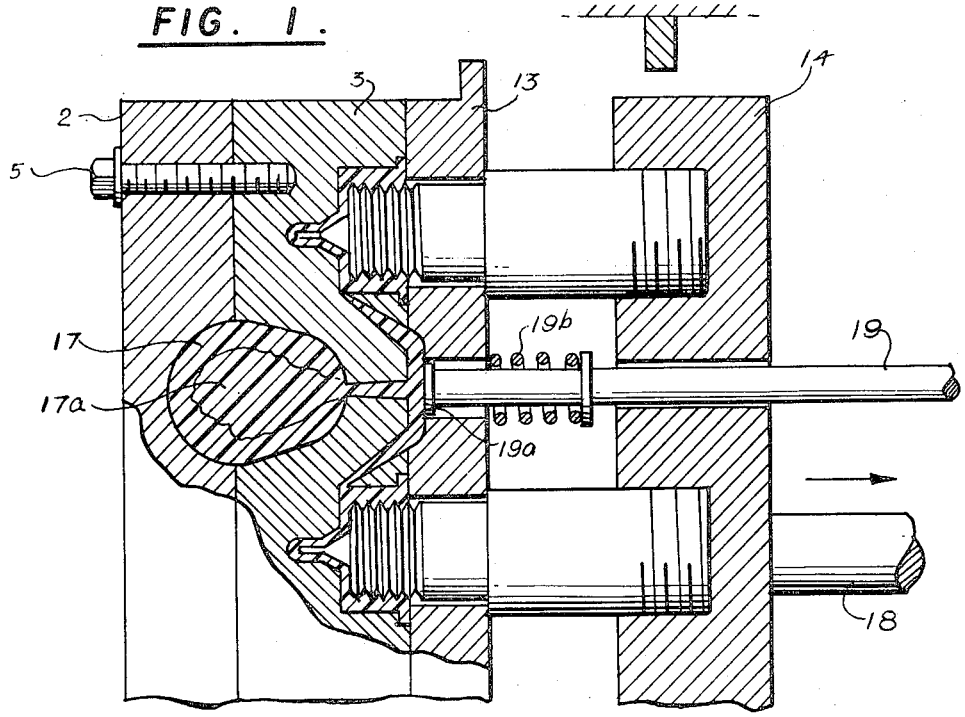
FIG. 1 is a transverse sectional view through a portion of a mold according to the invention, showing a single insulated runner, associated sprue, and cap cavities, in the initial molding stage, during the period when the cap material is becoming set sufficiently for withdrawal from the mold.

The mold comprises a stationary mold plate made up of two halves 2 and 3, suitably fastened together as by bolts, 5 and each containing one-half of the insulated runner channels designated at 4 in FIG. 5 and 7 in FIG. 6, so that when these two surfaces are put together, as shown in FIG. 7, they provide circular channels into which plastic is fed through supply channel 6 from a conventional plastic extruder which is not shown. This plastic material is supplied at sufficiently high temperature and pressure, so that it is in a fluid-like form, and rapidly fills the runner channels 4, 7, which are shown as having six runner arms, although it will be apparent that any convenient number of such arms can be used. At the remote end of each of these arms there is an aparture 8 in mold plate 3, through which the plastic flows via a tapered runner lead 8a into the system of sprue channels 9 as indicated in FIG. 8. As will be seen from FIG. 1, the major portion of the sprue channel 9 is shown formed in movable mold plate 13, but part of it may be cut into the face of stationary die plate 3, or if desired may be cut entirely into movalbe die plate 13. The sprue channels 9 are connected at intervals along their length by tapered lead channels 9a to the upper portion of cavities 10 formed in plate 3. In addition, small lateral cavities 9b (FIG. 8) are formed in plate 13, but these are only for the purpose of balancing the plastic flow, to insure proper distribution of the plastic material to the cap cavities, and are not part of the present invention. It will thus be seen that during the period when the parts are in the relative position shown in FIG. 1, hot plastic is forced into all of the cap cavities, and the initial stage of the cycle has begun. The old parts remain in the position shown in FIG. 1 for a sufficient time for the plastic material to set; to facilitate this, the die is usually water-cooled, but since this is conventional, it is not shown in the drawings. In a typical case, a complete cycle may take in the order of 10 to 20 seconds, most of which time is the cooling time required for the plastic to set.

Figure 2:
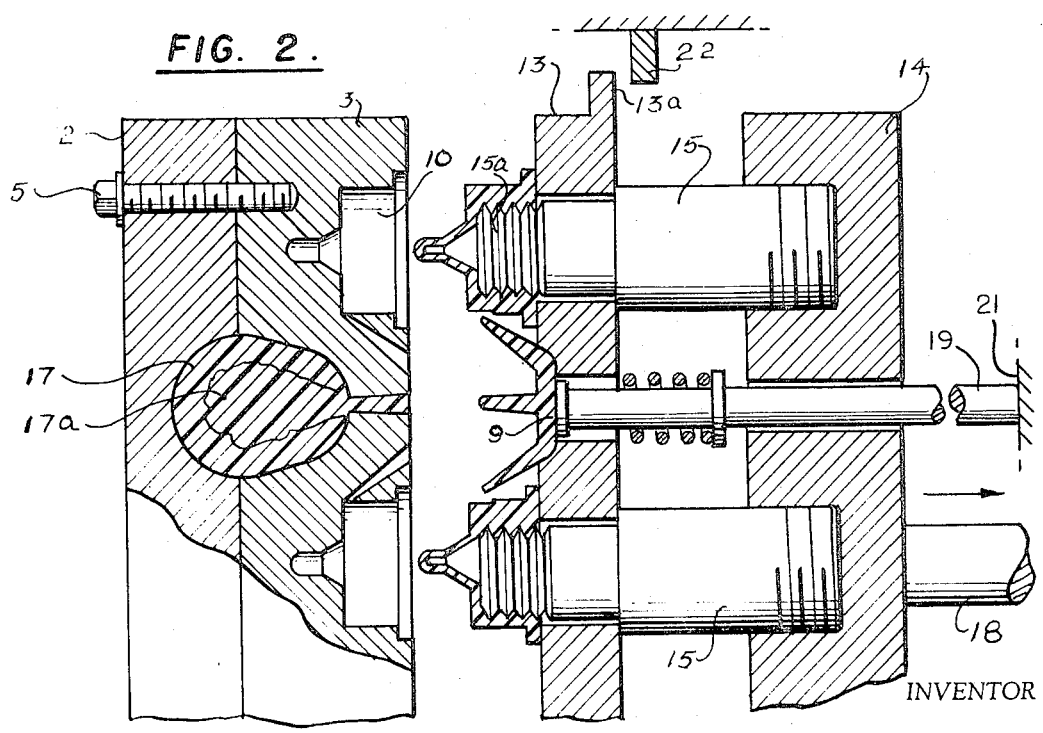
FIG. 2 shows the same mold during the initial stage of withdrawal of the formed caps from the mold, and immediately prior to ejection of the sprue.
Figure 3:
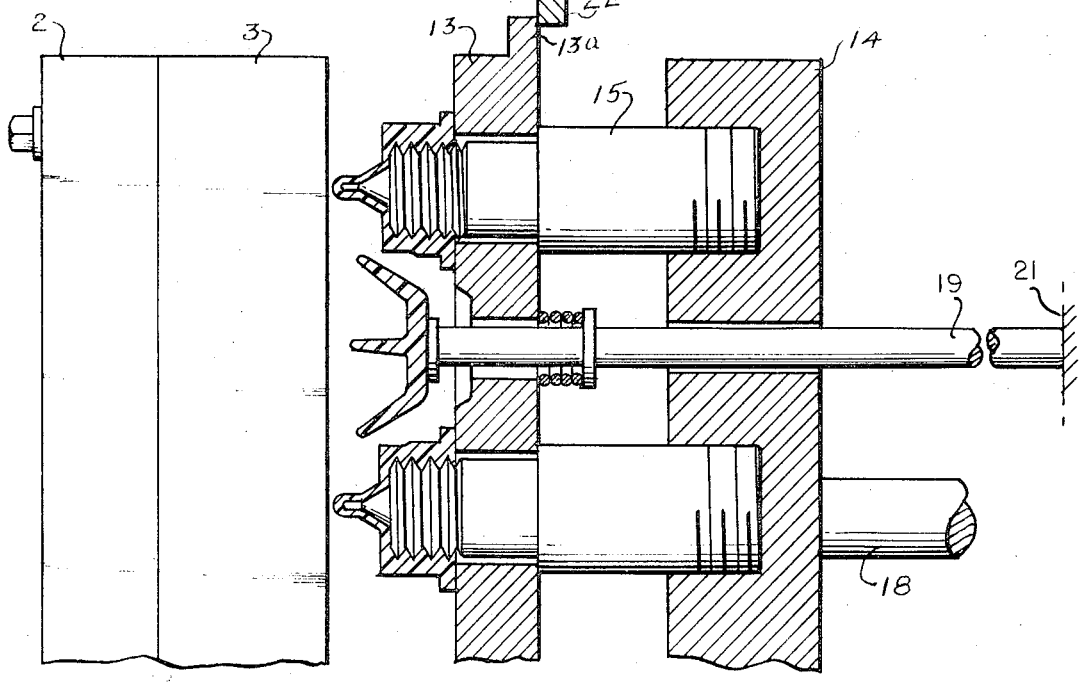
FIG. 3 shows the action immediately after FIG. 2, when the spure has been initially ejected or separated from the mold, and ejection of the cap is about to begin.

After the caps have set sufficiently, the backing die plate 14 begins to move away from the stationary plate, by means of conventional machinery acting on the plate through suitable elements indicated by cylindrical rod 18, a number of which will be attached to the backing plate. The means for accomplishing this are part of commercially developed molding equipment and need not be described here. It will be noted that the interiors of the caps have been molded about the threaded ends 15a of studs 15 which are screwed or otherwise fastened to movable plate 14 and which extend loosely on a reduced diameter through movable plate 13. The caps are therefore pulled out of the mold cavities 10, being thereby separated from the tapered sprue lead 9a' at the orifice of small diameter through which plastic is fed to the cap mold. At the same time, the sprue 9 adheres sufficiently to plate 13 so that it is also pulled back with plate 13 and is also separated from the large supply channel 4 – 7 at the smallest diameter of the sprue feed channel 9a. The cross section of the sprue at this plane therefore assumes the shape shown in FIG. 2, and the sprue has now been separated from the individual caps; however, the aprue is still carried by plate 13 and must be ejected therefrom. A sprue ejector rod 19 is provided, which is slidable in plates 13 and 14 and has an enlarged head 19a which is bottomed with respect to plate 13 by means of spraying 19b. In the position shown in FIG. 2, the bottomed end of rod 19 engages a stationary portion of the machine as indicated at 21 so that this rod cannot move any further to the right, while the plates 13 and 14 continue moving into the position shown in FIG. 3, where lug 13a of plate 13 engages a fixed stop 22. Since rod 19 has not been able to move during this part of the motion, it therefore strips the sprue away from plate 13 as indicated in FIG. 3. The sprue now begins to fall by gravity toward the bottom of the mold.

Due to the cooling of plates 2 and 3, the plastic material in the runner channel 4, 7, will also solidify to some extent near the periphery of the channel, as shown at 17, but the diameter of the channel is sufficiently great so that the material in the interior of the channel remains liquid as indicated at 17a, and does not solidify due to the fact that the hardened material 17 forms in effect a layer of thermal insulation which keeps the material at the center of the channel at sufficiently high temperature so that it does not stiffen or set. This condition persists long enough so that the material at the center is still molten when the caps and sprues have been ejected and the parts returned to their position shown in FIG. 1 ready for the next cycle of operation. It will be seen that the runners thus formed are self-insulated, and permit an uninterrupted supply of molten plastic material to be furnished to the cap cavities for succeeding cycles of operation. Of course, when a given run is completed and the material stops flowing through the channels 4, 7 for a sufficient length of time, the runner becomes entirely hardened; therefore, before the next batch can be started the two sections 2 and 3 must be separated and the hardened runner removed.

Figure 4:
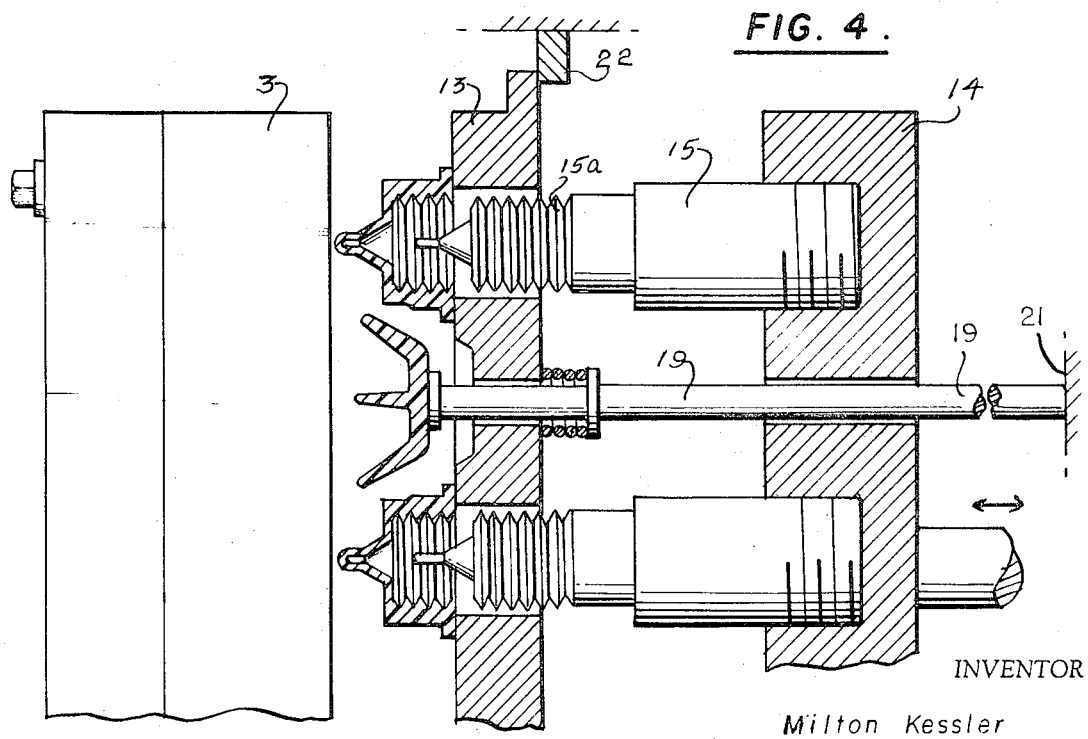
FIG. 4 shows the action after the cap has been completely separated from the mold and is about to fall away from the mold by gravity.

Continuing with the operation of the molding cycle, in the position of FIG. 3, the plate 13 is now stopped from further motion to the right by engagement of ears 13a (there being several of these around the periphery of the plate) with stop 22, so that as plate 14 continues to move to the right in the position of FIG. 4. the threaded end of studs 15 is stripped from the individual caps as shown in FIG. 4, which can be done without destroying the interior thread of the cap because the cap is still in a relatively soft and warm condition and therefore has sufficient elasticity to permit the threads to be undamaged during the stipping operation. Very shortly thereafter, as the cooling process continues, the plastic material become sufficiently rigid so that such stripping would be impossible since some deformation of the interior must occur during this process, but the caps in practice retain sufficient elastic memory to resume their original interior configuration with the interior thread undamaged. It will be seen that in the position of FIG. 4, the caps are no longer supported and can begin to fall along with the sprue, which has already begun to fall to the bottom of the mold, where the parts are collected by suitable conventional equipment which are not part of the present invention.

Since in practice there are various guide rods (not shown) which keep the movable and stationary parts of the mold in alignment, it is an advantage of the shorter sprues made possible by the present invention, that they can be made sufficiently small to fall clear of such guide rods without becoming entangled therein as would be the case with longer, more complex sprues.

After the position of FIG. 4 has been reached, continued operation of the driving mechanism through cylinder 18 causes the action to be reversed and the plates 14 and 13 to move back into the initial position of FIG. 1, in preparation for the next cycle. It will be understood that the particular stripping means shown are intended only to be exemplary, since the caps and sprues can be ejected in other ways, as will be apparent to those skilled in the art. By the use of the present invention, a supply of hot material is maintained at a number of points on the stationary die plate, so that short sprues may be used, permitting a larger number of cap mold cavities to be employed than has therefore been possible.

I claim:

1. 
  a. A multiple molding machine for thermoplastic caps comprising a stationary portion and a movable portion in abutting surface relation with cap cavities and sprue channels cut into their abutting surfaces to form mold cavities,
  b. said stationary portion comprising two metal blocks having abutting surfaces with runner channels cut into said surfaces,
  c. said runner channels branching from a common feed inlet aperture to a number of short runner branches of large diameter, all supplied in parallel from the common inlet aperture,
  d. each of said branches leading to an inlet of a separate sprue channel cut into the abutting surfaces of said stationary and movable portions,
  e. each said sprue channel unit branching from said last inlet to a number of short sprue channels supplied in parallel through said inlet,
  f. each said short sprue channel supplying a number of cap cavities cut into said last abutting surfaces by means of tapered sprue leads running from said sprue channels to the top portion of said cap cavities,
  g. means for supplying thermoplastic material under pressure through said runner feed inlet aperture to said cap cavities, h. means for cooling said mold until the thermoplastic material in the sprue and cap cavities has hardened sufficiently to be ejected from the mold, i. said runner channels being of sufficiently large diameter so that the plastic material in them is hardened by said cooling only at a layer adjacent the surfaces of said channels, to form an insulating layer of plastic material of generally tube-like configuration at the center of which the plastic material remains at a sufficiently high temperature to flow through the runners to supply the sprue for successive cycles of operation.

2. The invention according to claim 1, j. said movable portion of the machine comprising a movable plate and means for withdrawing said movable plate from said stationary portion to separate the hardened caps and sprue material, carried by said plate, from said cap cavities and sprue channels, and for separating said sprue material from the caps.

k. sprue ejector rod means passing through said movable plate for ejecting said sprue material from said movable plate during initial travel of said movable plate, l. and means for separating said hardened caps from said movable plate during continued travel of said movable plate.

* * * * *